United States Patent [19]
Bartholomew

[11] Patent Number: 5,296,536
[45] Date of Patent: Mar. 22, 1994

[54] POLYMER BASED ARTICLES HAVING INCREASED STRUCTURAL RIGIDITY

[75] Inventor: Donald D. Bartholomew, Mt. Clemens, Mich.

[73] Assignee: Proprietary Technology, Inc., Southfield, Mich.

[21] Appl. No.: 761,502

[22] Filed: Sep. 18, 1991

[51] Int. Cl.$^5$ ................................. C08K 3/04
[52] U.S. Cl. .................... 524/495; 524/490; 524/496
[58] Field of Search ............ 524/490, 495, 496

[56] References Cited

U.S. PATENT DOCUMENTS

| | | |
|---|---|---|
| 3,830,774 | 8/1974 | Jordan et al. . |
| 3,864,305 | 2/1975 | Jordan et al. . |
| 4,360,627 | 11/1982 | Okado et al. . |
| 4,784,695 | 11/1988 | Mito et al. . |
| 5,114,477 | 5/1992 | Mort et al. ........................ 106/20 |
| 5,178,980 | 1/1993 | Mort et al. ........................ 430/71 |

OTHER PUBLICATIONS

Edelson, Edward; "Buckyball-The Magic Molecule", Popular Science, pp. 52–57, 87, Aug. 1991.
Vaughan, Christopher., "Tracking An Elusive Carbon", Science News, vol. 135, pp. 56–57, Jan. 28, 1989.
"Keep Your Eye on the 'Bucky Balls'", Newsweek, Apr. 29, 1991.
Stipp, David., "Superconductor Signs Improve For Buckyballs", Wall Street Journal, Aug. 5, 1991.
Pennisi, Elizabeth, "Buckyballs Still Charm", Science News, vol. 140, pp. 120–123, 127.

Primary Examiner—Paul R. Michl
Assistant Examiner—Edward Cain
Attorney, Agent, or Firm—Harness, Dickey & Pierce

[57] ABSTRACT

The present invention relates to a product for structurally supporting polymer chains comprising fullerene molecules mixed with a polymer mass wherein the fullerene molecules have a relatively large bend radius over which the polymer chains contained therein can be deformably flexed.

13 Claims, 1 Drawing Sheet

POLYMER BASED ARTICLES HAVING INCREASED STRUCTURAL RIGIDITY

BACKGROUND OF THE INVENTION

1. Field of the Invention

This invention relates to polymer based articles having increased structural rigidity. More particularly, the invention relates to polymer based articles formed by polymer mixes containing fullerenes whereby the fullerenes impart structural rigidity to the polymer chains which make up the polymer based articles.

2. Description of Related Art

Graphitic carbon molecules, which consist of hexagonally arranged carbon atoms are used throughout the chemical and manufacturing industries for reinforcing polymer based compounds such as synthetic and natural rubbers. Graphitic carbon tends to be a good conductor of electricity and heat but is extremely soft and malleable. Likewise, amorphous forms of carbon such as carbon black have relatively large specific surface areas and improved reinforcing properties, but tend to be poor resistors against heat build up. Further, carbon black tends to have a high modulus of elasticity but is poor in fatigue resistance and cut resistance.

Ideally compounds used as reinforcing agents will be good conductors of electricity and heat, should have a large specific surface area with improved reinforcing properties, will have a high modulus of elasticity and will impart good fatigue and cut resistance characteristics.

It is therefore a primary object of the present invention to provide polymer based structures formed from a combination of polymer chains and fullerene molecules.

A further advantage of the present invention is to provide polymer based products formed from a combination of polymer chains and fullerene molecules wherein the polymer based product is resistant to deformation caused by excessive heat.

A further advantage of the present invention is to provide polymer based products formed from a combination of polymer chains and fullerene molecules wherein the polymer based product is resistant to deformation caused by physical contact with other objects.

Other advantages and features will become apparent from the following specification taken in connection with the accompanying drawings.

DETAILED DESCRIPTION OF THE PREFERRED EMBODIMENT

The present invention is described for exemplary purposes as being embodied in a rubber-like material which will have an enhanced resistance to deformation and heat. It will be understood that the present invention may be utilized in various other polymer based products.

Figure 1:
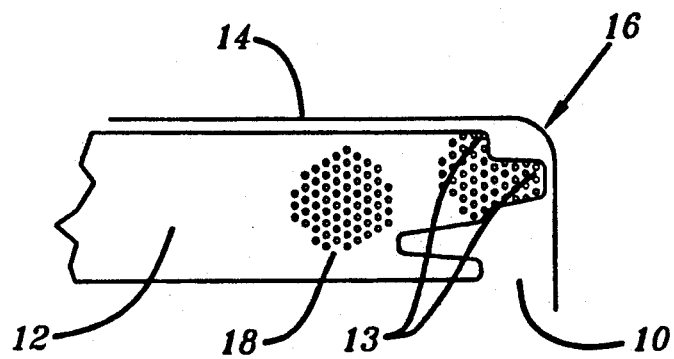
FIG. 1 is a cross-sectional side view the end of a graphitic carbon molecule engaged by a polymer molecule.

Referring to the embodiment of FIG. 1 a cross-sectional view of the end of a graphitic carbon molecule 12 comprised of carbon atoms 18 and engaged by a polymer molecule 14 is shown. Shortly, after introducing graphitic carbon molecules into a mass of polymer molecules, but prior to being subject to physical deformation due to strenuous mixing, formation of the desired part or deformation of a formed article of manufacture, polymer molecules 14 often tend to be aligned contiguously along the relatively flat surfaces of the graphitic carbon molecules and sheets of graphitic carbon 12. Due to the flat hexagonal shape of graphitic carbon molecules 12, graphitic carbon molecules and crystalline forms (i.e., sheets) of graphitic carbon tend to have relatively sharp edges 13. Polymer molecules 14 tend to generally overhang the edges 13 of the graphitic carbon molecules 12. Since the polymer molecules 14 tend to overhang the graphitic carbon molecules 12 the bending radius of the polymer molecule tends to be short and at very large angles over the ends of graphitic carbon molecules 12.

Figure 2:
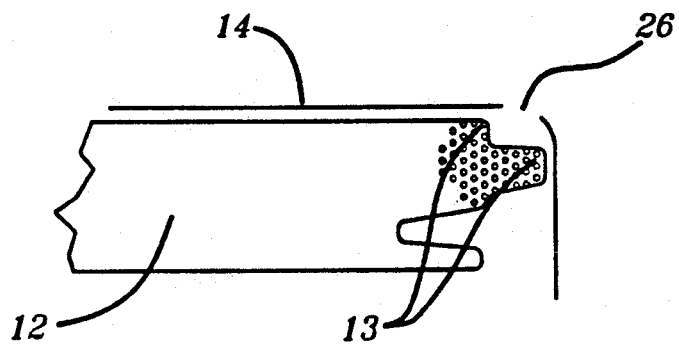
FIG. 2 is the cross-sectional side view of FIG. 1 showing a break in the polymer molecule.

Referring to FIG. 2 the graphitic carbon molecule 12 and the polymer molecule 14 of FIG. 1 are shown wherein the polymer molecule 14 is excessively deformed over the graphitic carbon molecule's edges 13. Deformation of the polymer molecule 14 can occur in any one of a number of ways. For example, deformation occurs as a result of strenuous mixing of the polymer molecules and graphitic carbon molecules as they are mixed into a polymer mass as in the case of compounding rubber, before the rubber is cross-linked or vulcanized. Deformation also occurs during formation of the desired part or article using the polymer mix containing polymer chains and carbon molecules as fillers for structural reinforcement. Deformation can also occur as a result of deforming the part or article which is made from the polymer mix through physical contact with other articles or by the formed articles.

When physical deformation occurs the polymer molecule 14 engages the sharp edges 13 of the graphitic carbon molecule 12. To a certain extent the graphitic carbon molecule 12 may flex slightly to accommodate subtle deformations, however, when the polymer molecule 14 is subjected to a force that exceeds the ability of the graphitic molecule 12 to flex along with the polymer molecule 14, the polymer molecule cannot resist the displacement forces and tends to break, as seen at 16, at edges 13 which have relatively small radii over which the polymer molecule 14 can deflect. This deflection of the polymer molecule 14 is referred to herein as the bend radius.

Figure 3:
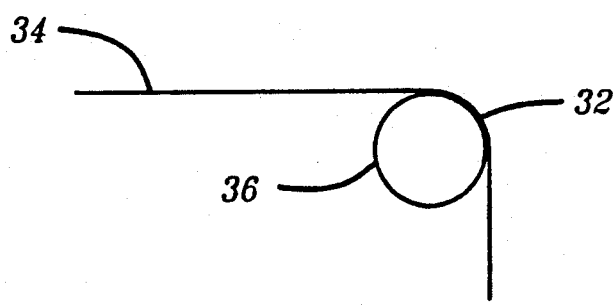
FIG. 3 is a cross-sectional side view of a fullerene carbon molecule engaged by a polymer molecule.
Figure 4:
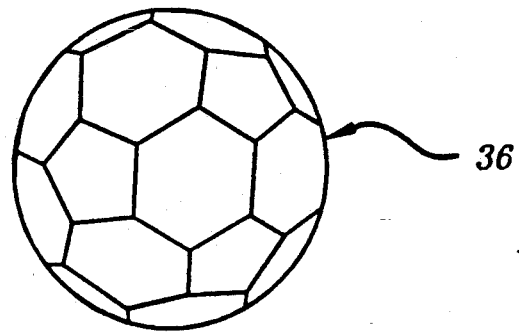
FIG. 4 is a three-dimensional view of a fullerene carbon as exemplified in FIG. 3.

Referring to FIG. 3 a cross-sectional side view of a polymer molecule 14 engaging a fullerene molecule 36 is shown. Although a single fullerene molecule 36 is shown, it will be understood that a number of fullerene molecules 36 can be agglomerated to form fullerene based carbon units with a larger bending radius.

Fullerene molecules 36 are truncated icosahedrons comprising a number of atoms which are arranged in a collection of regular pentagons and hexagons. For example, one fullerene molecule known as "buckminsterfullerene" has a 60 carbon atom structure in pure form having 12 pentagon and 20 hexagon-shaped sides. Fullerene molecules can also have atoms other than carbon, such as halogens, substituted into their molecular structures. As with all fullerene molecules the pentagon and hexagon-shaped sides are combined to form a ball-like structure having a hollow center. As a result of this unique ball-like structure the fullerene molecules 36 have a relatively large surface area, and a larger molecular bend radius.

Additionally, fullerene molecules are known to have excellent electrical and heat conducting characteristics which allow them to be used in various applications.

According to the teachings of the present invention, fullerene molecules 36 are combined with a polymer mass such as those which make up elastomers and plastics to give the polymer molecules or chains contained in the polymer mass structural rigidity against excessive deformation. As previously noted deformation of the polymer molecules 14 can occur in a number of ways. When physical deformation occurs due to physical contacts subjected upon the polymer molecule 14, the polymer molecule 14 is essentially flexed or bent over the radius of the carbon molecules which are used as support structures. Unlike the smaller bend radii 16 which occur at the molecular edges 13 of the graphitic molecules 12, fullerene molecules 36 have larger bend radii 32 due to the ball-like structure. When the polymer molecule is subjected to physical deformation the polymer molecule 14 bends over the large radius of the fullerene molecule 36 such that the stress is more evenly distributed over the length of the polymer molecule than it is when the polymer molecule 14 is bent over the edges 13 of a graphitic carbon molecule 12. Additionally, because the edges 37 of the fullerene molecule 36 are substantially less sharp than the edges of a diamond or graphitic carbon molecule 12, fullerene molecules 36 do not have naturally occurring stress points such as those presented by the edges 13.

Since the polymer based articles which incorporate fullerene carbon molecules 36 are much less subject to breaking than polymer based articles formed with graphitic carbon molecules 12 as support structures in polymer based articles, the polymer based articles which are structurally supported by fullerene molecules 36 tend to be stronger and exhibit better mechanical properties.

Increased internal stresses can also occur by exposing the polymer mix or formed article made with the polymer mix to excessive heat. An increase in the temperature of the polymer mix or article made with the polymer mix increases the "Brownian" type motion of the atoms within the molecule chain of the polymer and any attached chemical groups. This increase in movement or Brownian motion often gives rise to greater internal stresses in the polymer chains 14. Typically, these internal stresses result in a smaller bend radius making it more likely that the polymer chain is subject to breaking. Fullerene molecules 36 tend to reduce the internal stresses of the polymer molecules 14 by absorbing excess heat, this in turn limits the reduction in bend radius of the polymer chain.

While it will be apparent that the preferred embodiment of the invention disclosed is well calculated to provide the advantages stated above, it will be appreciated that the invention is susceptible to modification, variation and change without departing from the proper scope or fair meaning of the subjoined claims.

What is claimed is:

1. A product which limits the structural deformation of polymer chains in a mixture, comprising a combination of polymer chains and fullerene molecules used in polymer based articles, whereby said fullerene molecules structurally support the polymer chains to preclude excessive deformation.

2. The product of claim 1, wherein said polymer chains can be deformably flexed over said fullerene molecules to reduce the occurrence of polymer chains breaks.

3. The product as set forth in claim 2, wherein a plurality of said fullerene molecules have a structure comprising at least 40 carbon atoms.

4. The product as set forth in claim 3, wherein said fullerene molecules include fullerene molecules having a truncated icosahedron structure substantially similar to buckminsterfullerene.

5. The product as set forth in claim 1, wherein said fullerene molecules are electrically conductive.

6. The product as set forth in claim 1, wherein said polymer chains have a reduced stress level under heated conditions.

7. The product as set forth in claim 1, wherein said product is resilient to deformation, whereby said product readily returns to the original form once deformation ceases.

8. A product for structurally supporting polymer chains, comprising fullerene molecules mixed with a polymer mass, whereby said fullerene molecules have a relatively large bend radius over which said polymer chains can be deformably flexed.

9. The product as set forth in claim 8, wherein a plurality of said fullerene molecules have a structure comprising at least 40 carbon atoms.

10. The product as set forth in claim 9, wherein said fullerene molecules include fullerene molecules having a truncated icosahedron structure substantially similar to buckminsterfullerene.

11. The product as set forth in claim 8, wherein said fullerene molecules are electrically conductive.

12. The product as set forth in claim 8, wherein said polymer chains have a reduced stress level under heated conditions.

13. The product as set forth in claim 8, wherein said product is resilient to deformation, whereby said product really returns to the original form once deformation ceases.

* * * * *